United States Patent
Sato et al.

(10) Patent No.: US 6,978,824 B2
(45) Date of Patent: Dec. 27, 2005

(54) CONTROL UNIT COOLING DEVICE FOR AN INDUSTRIAL VEHICLE

(75) Inventors: Masatoshi Sato, Kariya (JP); Hidehito Kondo, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 0 days.

(21) Appl. No.: 10/172,394

(22) Filed: Jun. 14, 2002

(65) Prior Publication Data

US 2002/0189874 A1 Dec. 19, 2002

(30) Foreign Application Priority Data

Jun. 15, 2001 (JP) .............................. 2001-182143

(51) Int. Cl.[7] .............................. B60H 1/00; F28F 7/00
(52) U.S. Cl. ........................ 165/41; 165/80.3; 454/69
(58) Field of Search ........................ 165/41, 80.4, 80.3; 454/69

(56) References Cited

U.S. PATENT DOCUMENTS

| | | | | |
|---|---|---|---|---|
| 5,947,188 A | * | 9/1999 | Nestvall | ................ 165/80.4 X |
| 5,979,540 A | * | 11/1999 | Allison et al. | ................ 165/41 |
| 6,533,025 B1 | * | 3/2003 | Krogmeier et al. | ....... 165/42 X |
| 2001/0035280 A1 | * | 11/2001 | Okano et al. | ............. 165/41 X |

FOREIGN PATENT DOCUMENTS

| | | | | |
|---|---|---|---|---|
| JP | 2000-044195 | | 2/2000 | ............. B66F 9/22 |
| JP | 2000-125416 | | 4/2000 | ........... B60L 11/18 |

* cited by examiner

Primary Examiner—Ljiljana Ciric
(74) Attorney, Agent, or Firm—Morgan & Finnegan LLP

(57) ABSTRACT

A control unit cooling device for an industrial vehicle that can efficiently cool the control unit, wherein the control unit includes a cooling portion integrally formed with an electric circuit. In one embodiment of the invention, the control unit cooling device may be implemented on an industrial vehicle, such as a counterbalanced forklift. The cooling device has a first air current generation mechanism and a second air current generation mechanism. The first air current generation mechanism generates a first air current from air drawn in from the outside of a vehicle body. The first air current cools the electric circuit. The second air current generation mechanism generates a second air current from air drawn in from the outside of the vehicle body. The second air current cools the cooling portion. This efficiently cools the control unit.

17 Claims, 15 Drawing Sheets

CONTROL UNIT COOLING DEVICE FOR AN INDUSTRIAL VEHICLE

BACKGROUND OF THE INVENTION

The present invention relates to a cooling device and a counterbalanced forklift. More specifically, the present invention pertains to a cooling device for a control unit used in an industrial vehicle, such as a battery-powered forklift, and a counterbalanced forklift that has the cooling device.

A typical industrial vehicle, such as a battery-powered forklift, has a motor for carrying a load and a motor for driving the forklift. A control unit for controlling the motors is cooled inside the vehicle body.

FIG. 19 shows a prior art cooling device. In the prior art cooling device, cooling fins 101 are arranged on the outer surface of a control unit 100. The cooling fins 101 are covered with a duct cover 102. A cooling fan 103 is attached to one of the openings of the duct cover 102 and draws air into the duct cover 102. The heat generated by the control unit 100 is transmitted to the cooling fins 101 and then released by air drawn into the duct cover 102.

A cooling device, which is shown in FIGS. 20(a) and 20(b), is disclosed in Japanese Laid-open Patent Publication No. 2000-44195 as another cooling method. According to the cooling device of the above publication, a control unit 104 is secured to the outer surface of a battery case 105 with an aluminum base 106 located in between. The aluminum base 106 has a U-shaped groove 106a. A suction pipe 107 for hydraulic oil is inserted through the U-shaped groove 106a. The heat generated by the control unit 104 is transmitted to the aluminum base 106 and then released from the aluminum base 106 by low-temperature hydraulic oil, which flows through the suction pipe 107.

In accordance with the recent development of large battery-powered forklifts and high-powered electric motors, control units tend to be enlarged. That is, in an electric circuit of such control unit, substrates are fixed on a cooling plate, which has a cooling system, in layers. An electric power microchip of, for example, a FET transistor is directly mounted on the cooling plate such that the microchip is effectively cooled. Even though the control unit is cooled via the cooling plate as described above, the electric circuit may not be sufficiently cooled.

SUMMARY OF THE INVENTION

Accordingly, it is an objective of the present invention to provide a cooling device of a control unit for an industrial vehicle that can efficiently cool the control unit that has a cooling portion, which is integrally formed with an electric circuit, and to provide a counterbalanced forklift that has the cooling device.

To achieve the above objective, the present invention provides a cooling device of a control unit for an industrial vehicle. The industrial vehicle includes a control unit in which an electric circuit and a cooling portion are integrally formed. The cooling device includes a first air current generation mechanism and a second air current generation mechanism. The first air current generation mechanism generates a first air current from air drawn in from the outside of a vehicle body. The first air current cools the electric circuit. The second air current generation mechanism generates a second air current from air drawn in from the outside of the vehicle body. The second air current cools the cooling portion.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A cooling device according to a first embodiment of the present invention used in a control unit will now be described with reference to FIGS. 1 to 9.

Figure 2:
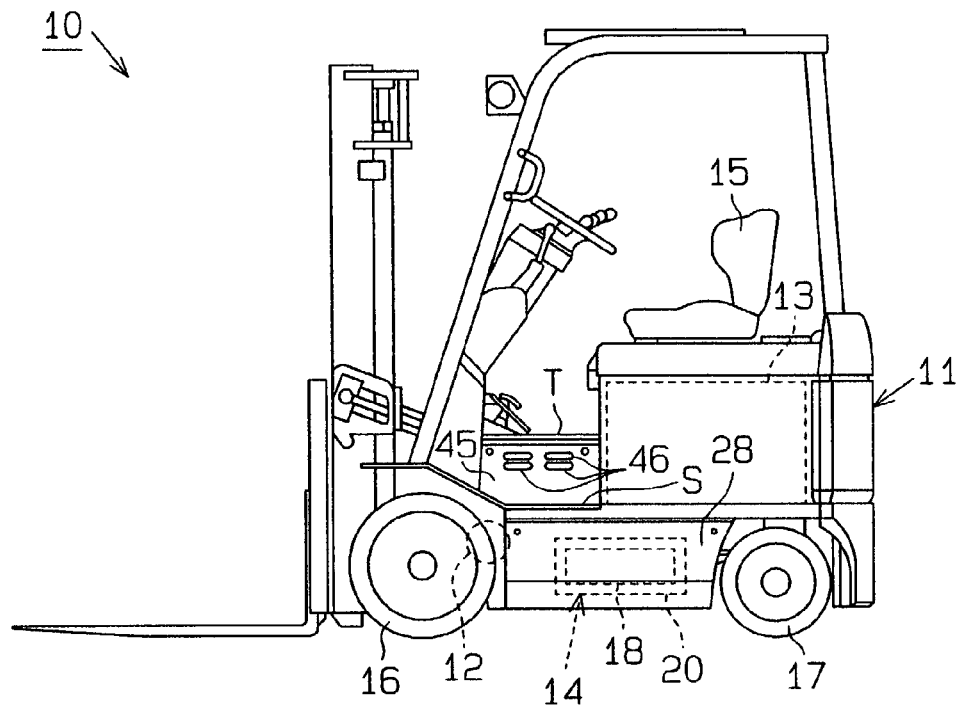
FIG. 2 is a schematic side view illustrating a forklift that has the cooling device shown in FIG. 1.

As shown in FIG. 2, an industrial vehicle, which is a counterbalanced battery-powered forklift 10 in the first embodiment, includes a drive motor 12, a load motor (which is not shown) for carrying a load, a battery 13, and a control unit 14 in a vehicle body 11. The drive motor 12 is arranged at the lower portion of the vehicle body 11 such that the drive motor 12 is located below a step S. The battery 13 is accommodated in a case, which is located between the step S and a seat 15. The control unit 14 is arranged between front wheels 16 and rear wheels 17 at the left side lower portion of the vehicle body 11. The diameters of the front wheels 16 are greater than the diameters of the rear wheels 17. The control unit 14 is arranged at a position lower than the highest points of the front wheels 16. The left side of FIG. 2 is referred to as the front side of the forklift 10 and the right side of FIG. 2 is referred to as the rear side of the forklift 10.

Figure 1:
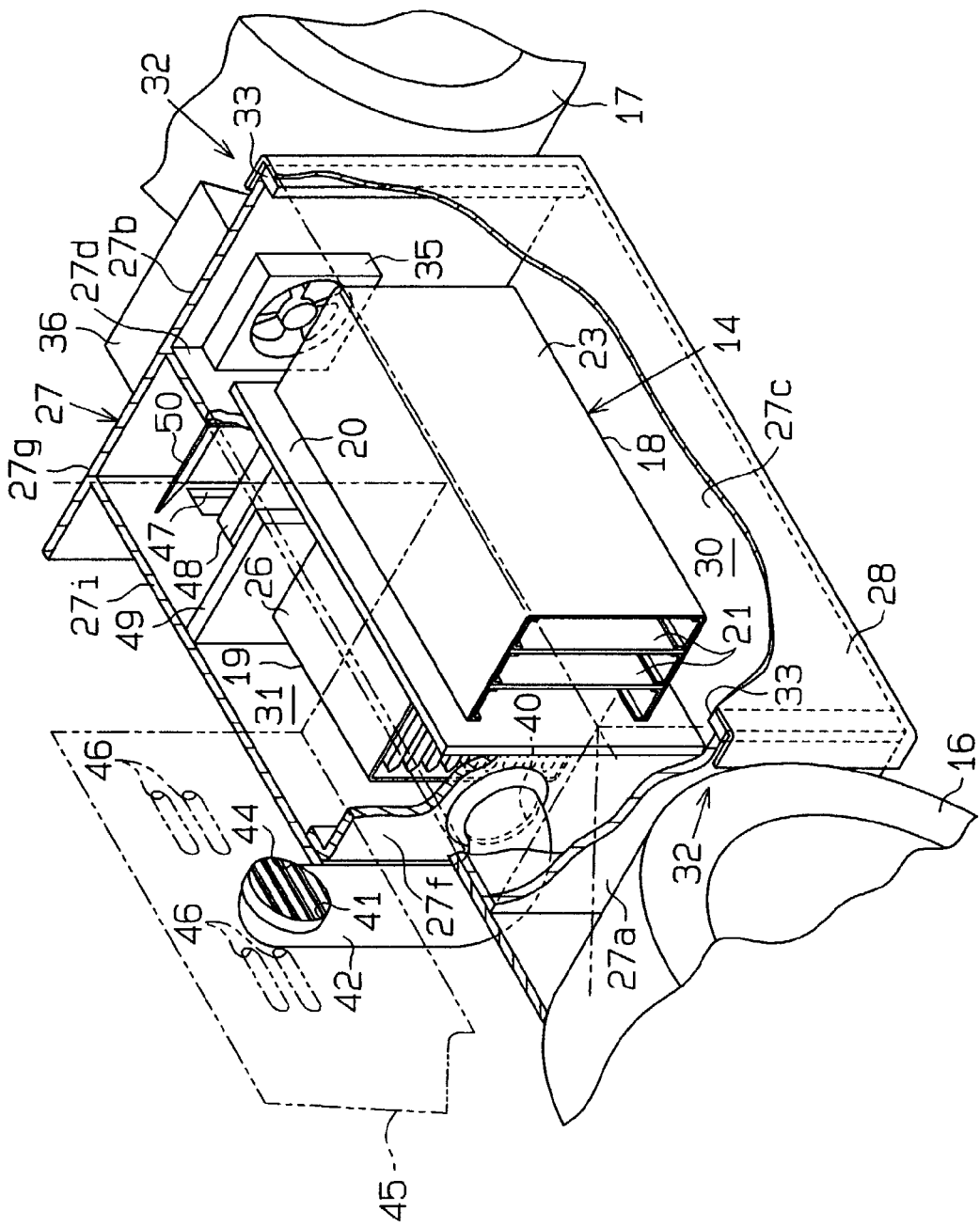
FIG. 1 is a schematic perspective view illustrating a cooling device according to a first embodiment of the present invention used in a control unit.
Figure 3:
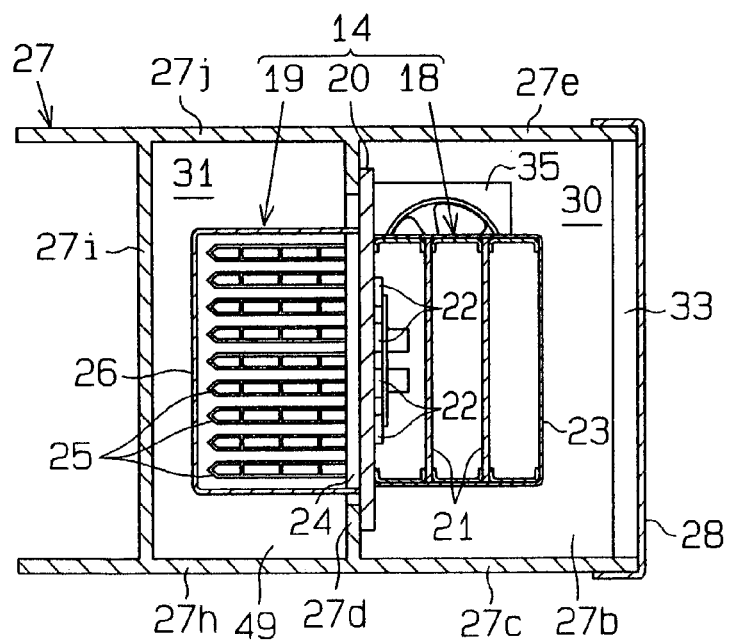
FIG. 3 is a diagrammatic cross-sectional view illustrating the control unit shown in FIG. 1 and first and second cooling passages.
Figure 4:
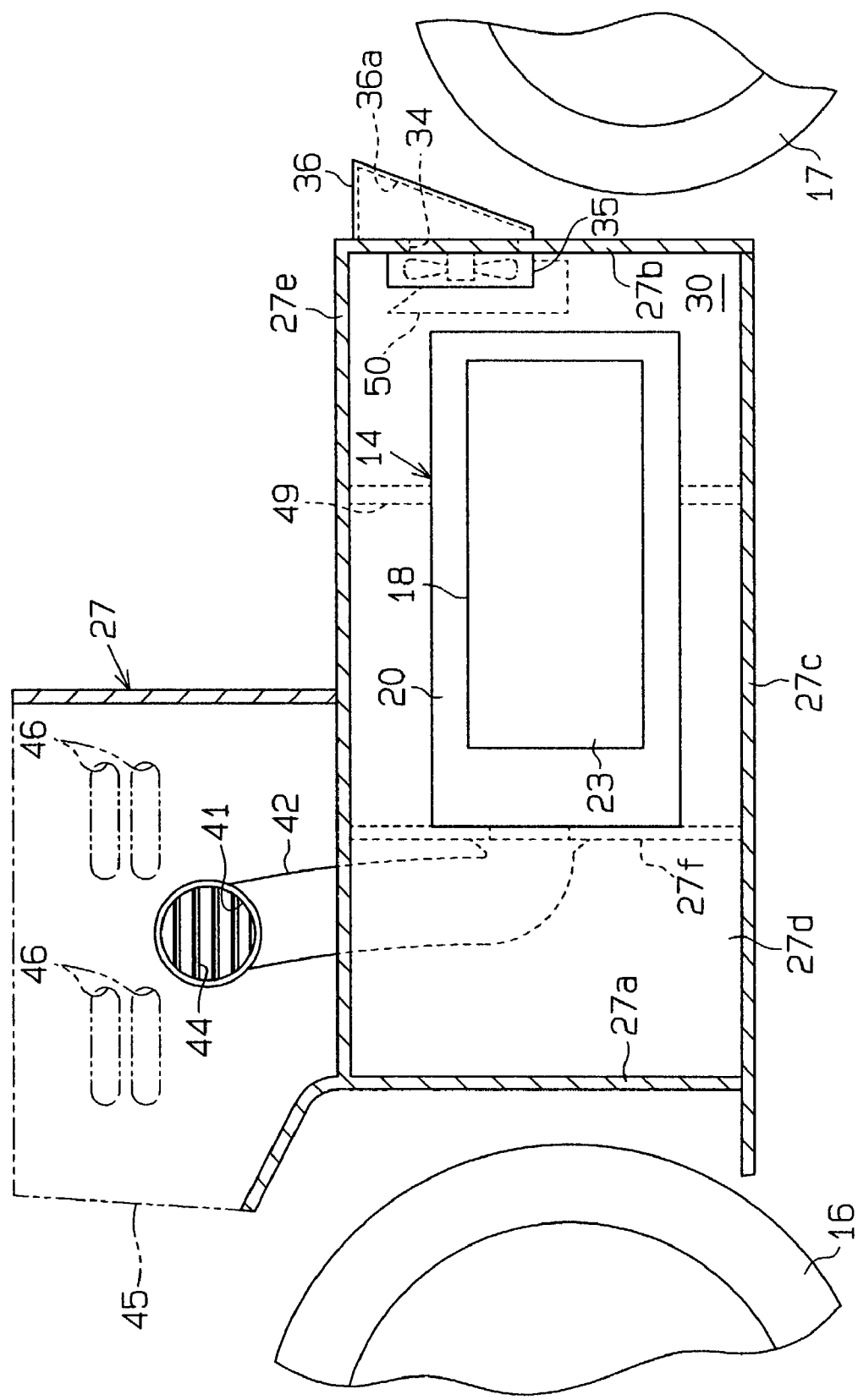
FIG. 4 is a cross-sectional view illustrating the first cooling passage.

As shown in FIGS. 1 and 3, the control unit 14 includes an electric circuit 18, a cooling portion 19, and a mounting board 20. The electric circuit 18 is arranged on one side of the mounting board 20, which is rectangular. The cooling portion 19 is arranged on the other side of the mounting board 20. The electric circuit 18 extends along the longitudinal direction of the mounting board 20.

The electric circuit 18 includes substrates 21, electric power microchips 22, and a unit cover 23. Each substrate 21 includes an electronic circuit, which controls the drive motor 12 and the load motor. The electric power microchips 22 control power supply to each motor. Each substrate 21 is rectangular and longitudinally extends parallel to the mounting board 20. Each substrate 21 is fixed inside a first inner passage forming portion, which is the unit cover 23 in the first embodiment, at predetermined intervals. Each electric power microchip 22 is directly fixed on the outer surface (left side surface in the first embodiment) of the mounting board 20. The unit cover 23 longitudinally extends along the mounting board 20 and both ends of the unit cover 23 are open.

The cooling portion 19 longitudinally extends along the mounting board 20. The cooling portion 19 has a rectangular base portion 24, which is fixed to the inner surface (right side surface in the first embodiment) of the mounting board 20. Cooling fins 25 are integrally formed with the base portion 24 and extend in the direction perpendicular to the mounting board 20. The cooling fins 25 are covered by a second inner passage forming portion, which is a fin cover 26 in the first embodiment. The fin cover 26 longitudinally extends parallel to the mounting board 20 and is fixed to the mounting board 20. Both ends of the fin cover 26 are open.

The mounting board 20 is secured to a vehicle frame 27, which is formed by a plate material. The cooling portion 19 is arranged in a hole formed in the vehicle frame 27 and is supported by the vehicle body 11. The control unit 14 is arranged such that the longitudinal direction of the control unit 14 extends in the front and rear direction of the forklift 10. The electric circuit 18 is arranged on the left side of the forklift 10 and the cooling portion 19 is arranged inward of the electric circuit 18. The unit cover 23 is arranged such that one of the openings faces forward and the other opening faces rearward of the forklift 10. The fin cover 26 is also arranged such that one of the openings faces forward and the other opening faces rearward of the forklift 10. The control unit 14 is covered by a lower left side panel 28. The lower left side panel 28 is supported by the vehicle frame 27 to be selectively opened and closed. The lower left side panel 28 is opened to perform maintenance of the electric circuit 18.

In the first embodiment, the vehicle frame 27 and the lower left side panel 28 are components of the vehicle body 11.

A cooling device, which cools the control unit 14, is located at the lower portion of the vehicle body 11. The cooling device will now be described.

As shown in FIGS. 1, 3, 4, and 5, the cooling device includes a first cooling passage 30 and a second cooling passage 31, which are substantially rectangular. The first cooling passage 30 accommodates the electric circuit 18 and the mounting board 20. The longitudinal direction of the electric circuit 18 and the mounting board 20 extend in the front and rear direction of the forklift 10. The second cooling passage 31 accommodates the cooling portion 19, the longitudinal direction of which extends in the front and rear direction of the forklift 10. The first cooling passage 30 generates a first air current with air drawn in from outside of the vehicle body 11. The first air current cools the electric circuit 18 and the mounting board 20. The unit cover 23 forms a first inner passage in the first cooling passage 30 for the first air current to flow through. The second cooling passage 31 mainly generates a second air current, which cools the cooling portion 19. In the first embodiment, the first cooling passage 30 functions as a first air current generation mechanism and the second cooling passage 31 functions as a second air current generation mechanism.

The first cooling passage 30 is defined by a front wall 27a, a rear wall 27b, a bottom 27c, a dividing wall 27d, and a ceiling 27e (shown in FIG. 3 only), which form a part of the vehicle frame 27, and the lower left side panel 28.

The second cooling passage 31 is defined by the dividing wall 27d, a front wall 27f, a rear wall 27g, a bottom 27h, an inner side wall 27i, and a ceiling 27j (shown in FIG. 3 only), which form the vehicle frame 27. The second cooling passage 31 shares the dividing wall 27d with the first cooling passage 30.

The first cooling passage 30 includes two first inlet portions 32 for drawing in air from the outside of the vehicle body 11. One of the inlet portions 32 is located between the lower left side panel 28 and the front wall 27a. The other inlet portion 32 is located between the lower left side panel 28 and the rear wall 27b. Each inlet portion 32 has a sponge filter 33 to prevent fluid, such as water, and dust from entering the first cooling passage 30. Aeration members, which are the sponge filters 33 in this embodiment, are fixed to the inner surface of the lower left side panel 28. Each sponge filter 33 closes the space between the lower left side panel 28 and the corresponding front wall 27a or the rear wall 27b. In this state, each sponge filter 33 allows air through and prevents fluid, such as water, and dust from entering the first cooling passage 30.

As shown in FIGS. 1, 4, 5, and 6, a first outlet 34 is formed in the rear wall 27b for exhausting the air that has cooled the electric circuit 18 from the first cooling passage 30 to the outside of the vehicle body 11. A first auxiliary cooling member, which is an exhaust fan 35 in the first embodiment, is attached to the inner surface of the rear wall 27b such that the exhaust fan 35 faces the first outlet 34. The exhaust fan 35 forces the air out of the first cooling passage 30 to the outside of the vehicle body 11 through the first outlet 34 and draws in air from the first inlet portions 32. This increases the flow rate of the first air current that cools the electric circuit 18. The exhaust fan 35 is located to substantially face the rear opening of the unit cover 23. The exhaust fan 35 sucks the air that is exhausted from the rear opening of the unit cover 23. Therefore, air drawn in from each first inlet portion 32 is efficiently introduced into the unit cover 23.

A box-like exhaust duct 36, which has an angular cross-section, is attached to the outer surface of the rear wall 27b. The exhaust duct 36 is communicated with the first outlet 34 and has an inside outlet 36a, which is open toward the inner side of the vehicle body 11. The exhaust duct 36 prevents foreign objects, such as rain, dirt, or tire particles, from entering the first cooling passage 30 from the outside of the vehicle body 11 through the first outlet 34. At the same time, the exhaust duct 36 exhausts the air that has cooled the electric circuit 18 to the outside of the vehicle body 11 through the inside outlet 36a. In the first embodiment, the first outlet 34 and the exhaust duct 36 form an exhaust portion of the first cooling passage 30. The exhaust duct 36 functions as an exhaust side filtering mechanism.

As shown in FIGS. 1, 3, 4, and 5, the second cooling passage 31 accommodates the cooling portion 19 for the control unit 14 such that the longitudinal direction of the cooling portion 19 extend in the front and rear direction of the vehicle. The second cooling passage 31 generates the second air current, which cools the cooling portion 19, with air drawn in from the outside of the vehicle body 11. In the first embodiment, the fin cover 26 serves as a second inner passage. The second inner passage lets the second air current, which cools the cooling portion 19, flow through the second cooling passage 31.

Figure 5:
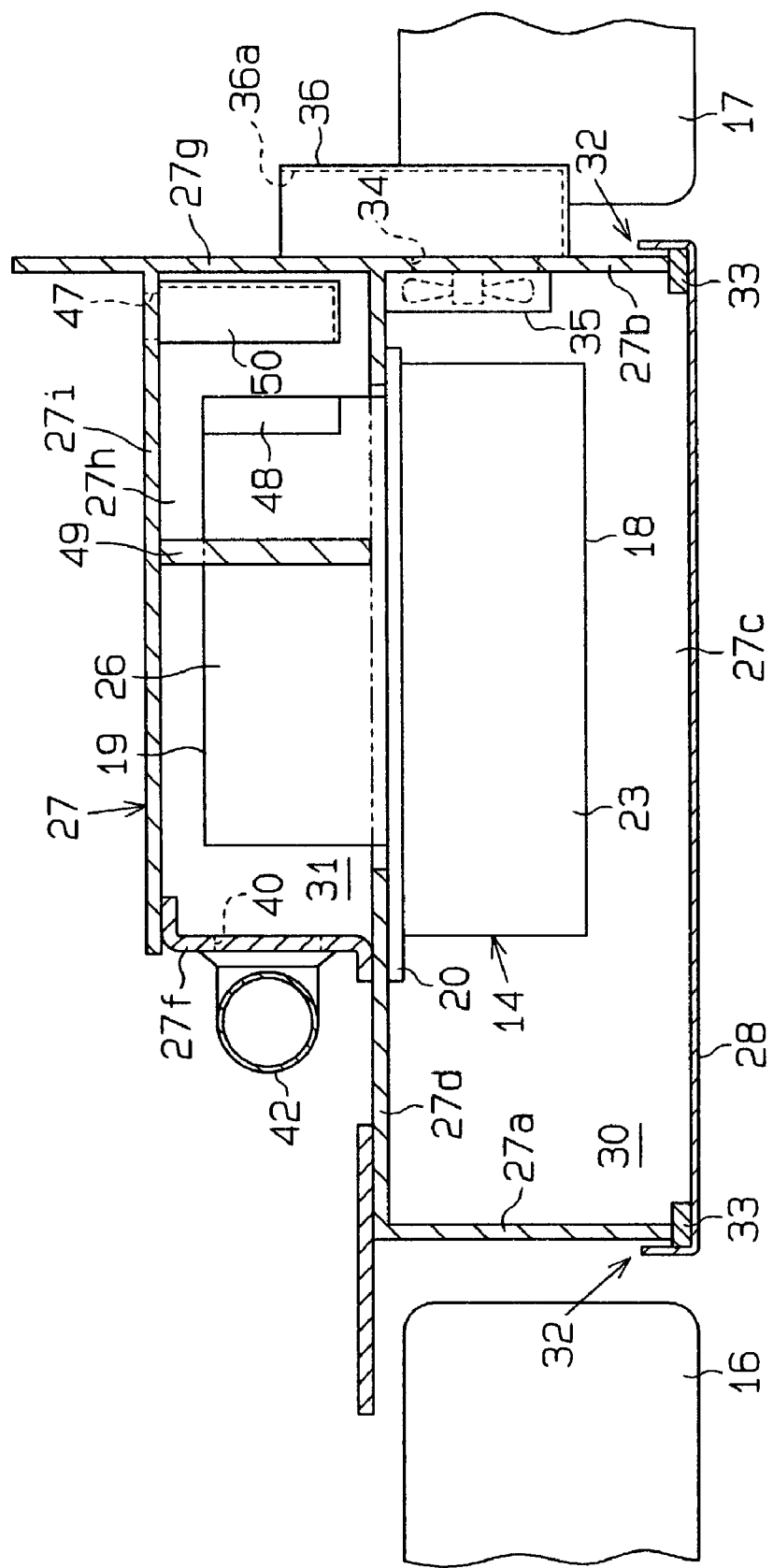
FIG. 5 is a diagrammatic cross-sectional view illustrating the first and second cooling passages.
Figure 6:
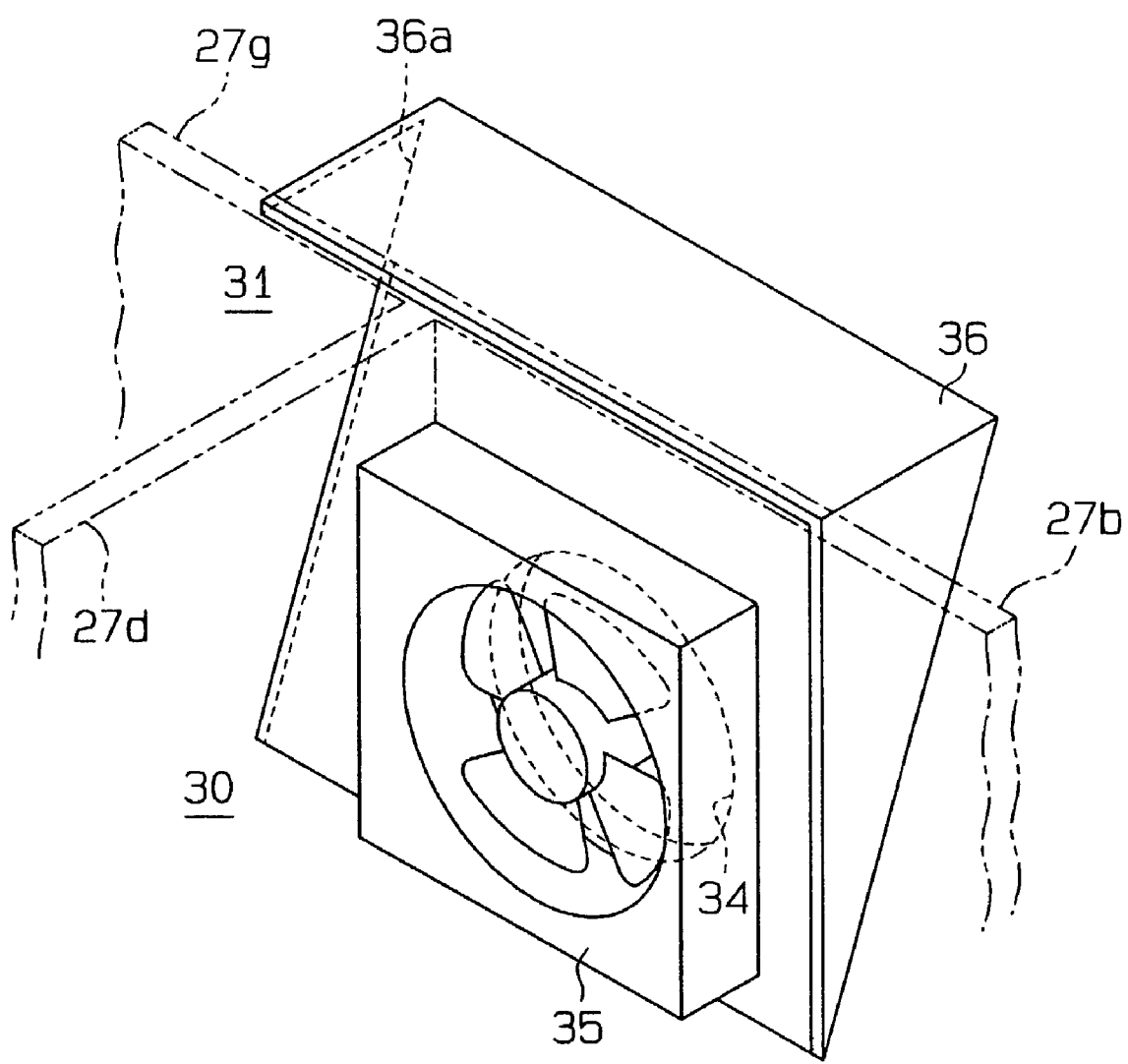
FIG. 6 is a schematic perspective view illustrating an exhaust fan and an exhaust duct.

As shown in FIGS. 1 and 5, an inlet 40 is formed in the front wall 27f of the second cooling passage 31. Air is drawn in from the outside of the vehicle body 11 through the inlet 40 for cooling the cooling portion 19. The inlet 40 opens at a position substantially opposite to the front opening of the fin cover 26.

Figure 7:
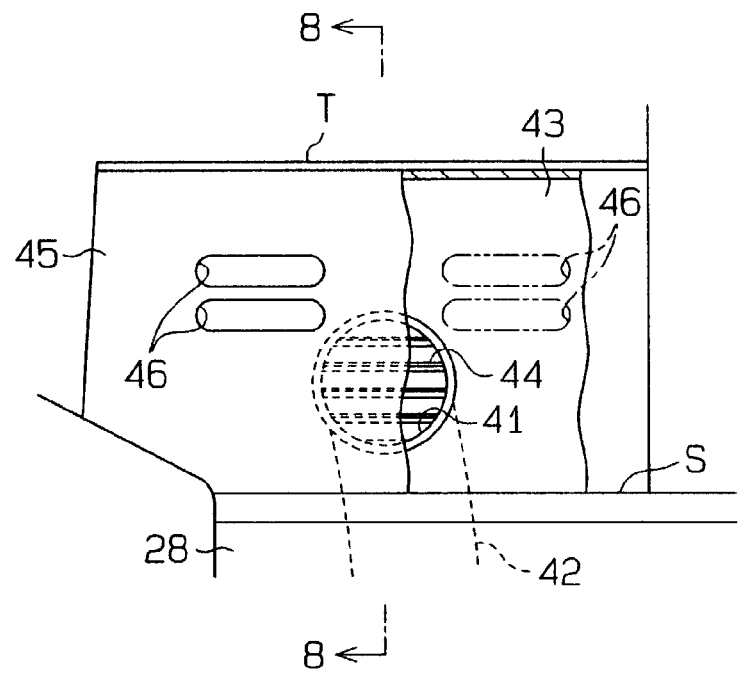
FIG. 7 is a schematic front view illustrating outer inlets, an upper inlet, and an inlet duct.
Figure 8:
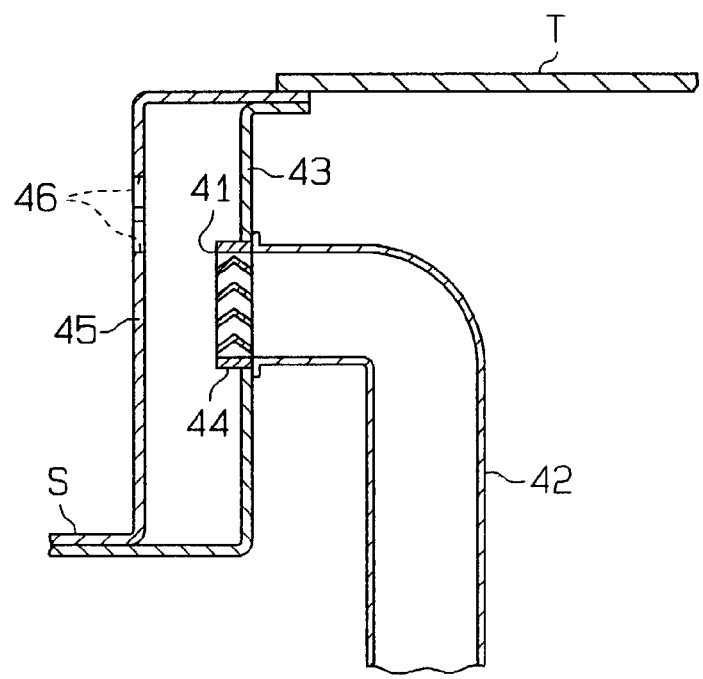
FIG. 8 is a schematic cross-sectional view taken along line 8—8 in FIG. 7.

As shown in FIGS. 1, 4, 7, and 8, the inlet 40 is communicated with an upper inlet 41 through a cylindrical inlet duct 42. As shown in FIGS. 7 and 8, the upper inlet 41 is formed at the substantial center of an inside side panel 43, which is located between a toe board T and the step S. The upper inlet 41 has a louver 44, which prevent water from entering from above.

An outside side panel 45 is located to cover the inside side panel 43. The outside side panel 45 includes four outside inlets 46, which communicate the upper inlet 41 with the outside of the vehicle body 11. Each outside inlet 46 is formed at a portion upper than the upper inlet 41. The outside inlets 46 are located not to overlap the upper inlet 41 in the front and rear direction of the forklift 10. A path that extends from the outside inlets 46 to the upper inlet 41 forms an inlet path. In the first embodiment, the upper inlet 41, the inside side panel 43, the louver 44, the outside side panel 45, and the outside inlets 46 form an inlet side filtering mechanism for suppressing foreign objects from entering the second cooling passage 31. The suppressing mechanism prevents fluid such as rain and washing water from entering the second cooling passage 31 through the inlet duct 42 and the inlet 40 from the outside of the vehicle body 11. More specifically, water that enters the vehicle body 11 through the outside inlets 46 drops down along the outer surface of the inside side panel 43. The water is then drained from between the inside side panel 43 and the outside side panel 45 to the outside of the vehicle body 11 through a drainage structure, which is not shown. Even if the water reaches the upper inlet 41 through the outside inlets 46, the louver 44 prevents the water from entering the upper inlet 41.

The inlet duct 42 guides air from the outside inlets 46 and the upper inlet 41, which are arranged at positions apart from the ground at a predetermined distance, to the inlet 40 of the second cooling passage 31, which is arranged at the lower portion of the vehicle body 11. In the first embodiment, the inlet 40, the upper inlet 41, the inlet duct 42, the inside side panel 43, the louver 44, the outside side panel 45, and the outside inlets 46 form a second inlet portion. A bent path formed by the upper inlet 41, the inside side panel 43, louver 44, the outside side panel 45, and the outside inlets 46 prevents foreign objects from entering the second cooling passage 71.

Figure 9:
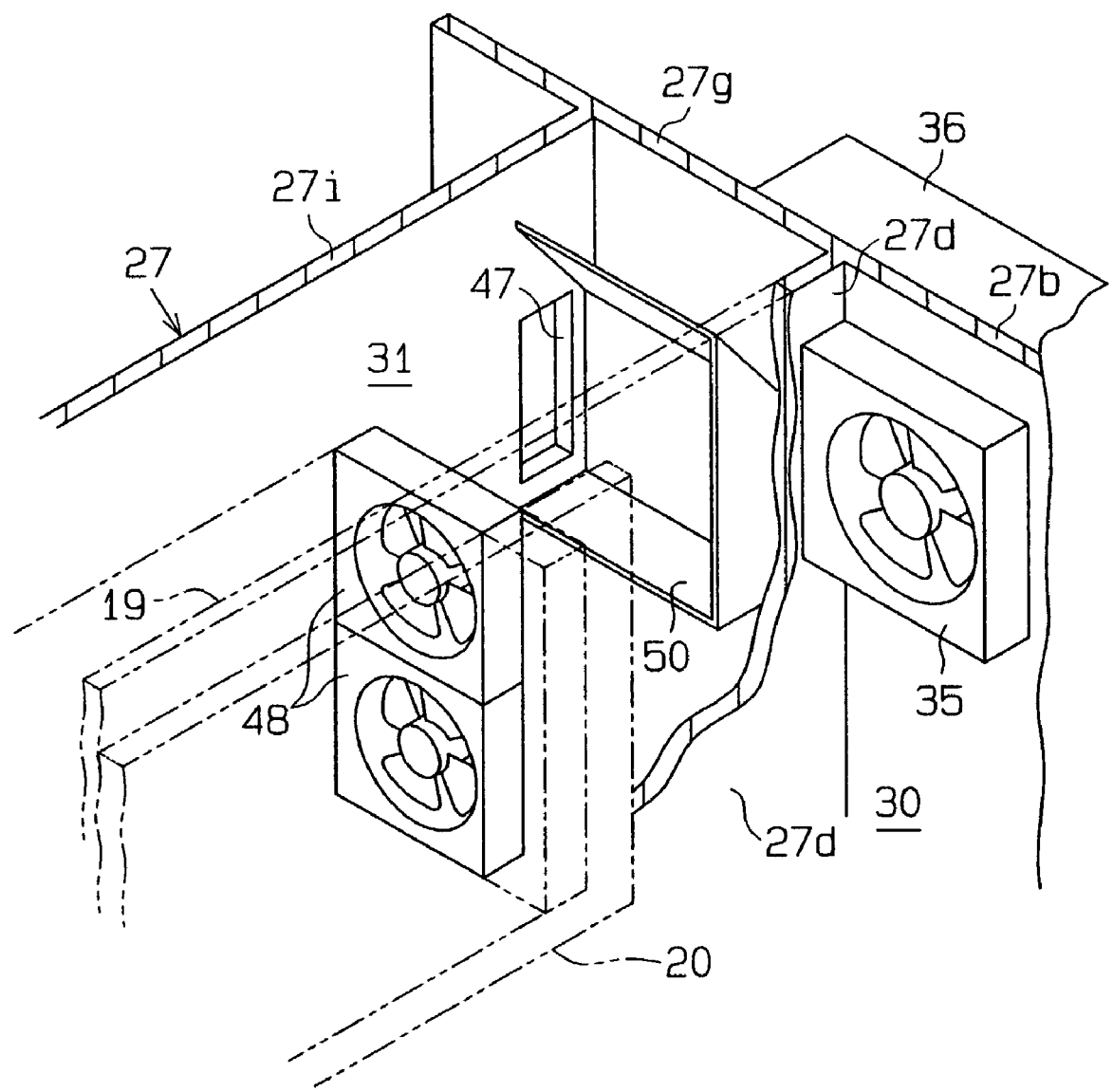
FIG. 9 is a schematic perspective view illustrating cooling fans, an exhaust guide, and a second outlet.

As shown in FIGS. 1, 5, and 9, a second outlet 47 is formed in the inner side wall 27i for exhausting the air that has cooled the cooling portion 19 from the second cooling passage 31 to the outside of the vehicle body 11. The second outlet 47, which serves as an exhaust portion, is open toward the inside of the vehicle body 11 to prevent foreign objects such as tire particles and water from entering the second cooling passage 31.

A second auxiliary cooling member, which is a cooling fan 48 (two cooling fans 48 are shown in FIG. 9) in the first embodiment, is attached at the vicinity of the rear opening of the fin cover 26. The cooling fan 48 forces the air inside the fin cover 26 rearward and exhausts the air to the outside of the vehicle body 11 from the second outlet 47. The cooling fan 48 draws air into the second cooling passage 31 through the outside inlets 46, the upper inlet 41, the inlet duct 42, and the inlet 40. This increases the flow rate of the second air current for cooling the cooling portion 19.

As shown in FIGS. 1, 3, and 5, a sponge cushion 49 is arranged on the outer surface of the fin cover 26 for closing the space between the fin cover 26 and the inner wall of the second cooling passage 31. The sponge cushion 49 functions as backward flow suppressing means. The sponge cushion 49 prevents the air that has cooled the cooling portion 19 from flowing back to the upstream of the cooling portion 19 from the rear opening through the outside of the fin cover 26.

As shown in FIGS. 1, 4, 5, and 9, an air guiding member, which is an exhaust guide 50 in the first embodiment, is attached to the inner side wall 27i. The exhaust guide 50 guides the air that is sent rearward of the forklift 10 by the cooling fan 48 to the second outlet 47. The exhaust guide 50 is substantially box-like and is open at a portion facing the cooling fan 48 and a portion facing the second outlet 47. The exhaust guide 50 prevents the air that is sent by the cooling fan 48 from being diffused and guides the air to the second outlet 47.

The operation of the cooling device according to the first embodiment will now be described.

When the exhaust fan 35 is activated and the air is exhausted to the outside of the vehicle body 11 from the first outlet 34 through the exhaust duct 36, the pressure in the first cooling passage 30 becomes lower than other portions. Therefore, air is drawn into the first cooling passage 30 from each first inlet portion 32 through the corresponding sponge filter 33. Since the exhaust fan 35 is arranged to face the vicinity of the rear opening of the unit cover 23, the pressure in the unit cover 23 reliably becomes low. Most of air drawn into the first cooling passage 30 through each first inlet portion 32 becomes the first air current that flows through the first inner passage formed by the unit cover 23. The air then directly cools the substrates 21 and the electric power microchips 22. Some of the air drawn into the first cooling passage 30 also cools the substrates 21 and the electric power microchips 22 indirectly via the unit cover 23. The first air current that has cooled the substrates 21 and the electric power microchips 22 is carried toward the first outlet 34 from the rear end of the unit cover 23 by the exhaust fan 35 and then exhausted to the outside of the vehicle body 11. As a result, the first air current that flows through the first inner passage in the unit cover 23 directly cools the electric circuit 18, that is, not indirectly through the cooling portion 19.

When the cooling fan 48 is activated, the air is drawn out of the fin cover 26 and then sent toward the exhaust guide 50. The air is guided toward the second outlet 47 by the exhaust guide 50 and then exhausted to the outside of the vehicle body 11. Air is introduced into the second cooling passage 31 from the inlet 40 through the inlet duct 42. Since the inlet 40 is arranged to face the front opening of the fin cover 26 and the pressure inside the fin cover 26 is low, most of air introduced into the second cooling passage 31 becomes the second air current that flows through the second inner passage formed by the fin cover 26. The second air current absorbs heat from the cooling fins 25 and indirectly cools the mounting board 20 and the electric power microchips 22. The second air current that has cooled the cooling portion 19 is carried toward the exhaust guide 50 from the rear opening of the fin cover 26 by the cooling fan 48 and then exhausted to the outside of the vehicle body 11. As a result, the second air current that flows through the second inner passage in the fin cover 26 from the front side of the forklift 10 to the rear side of the forklift 10 directly cools the cooling portion 19.

The first embodiment provides the following advantages.

Figure 19:
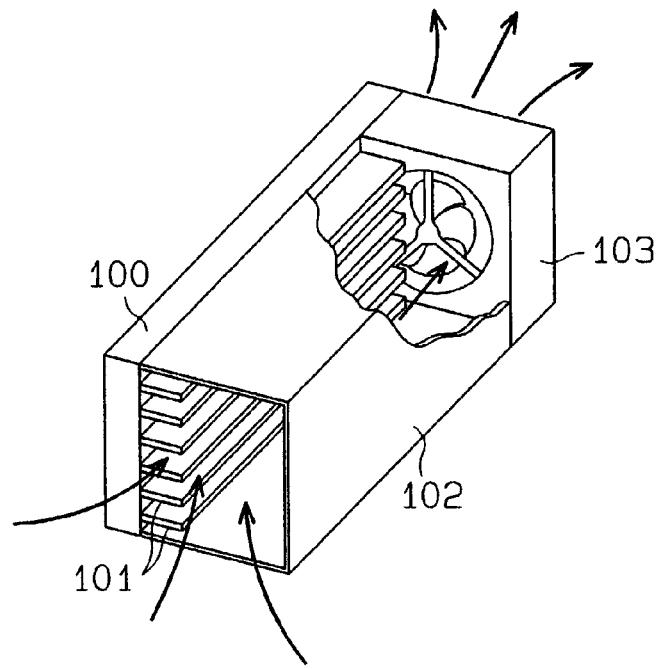
FIG. 19 is a diagrammatic perspective view illustrating a cooling device according to a prior art used in a control unit.
Figure 20A:
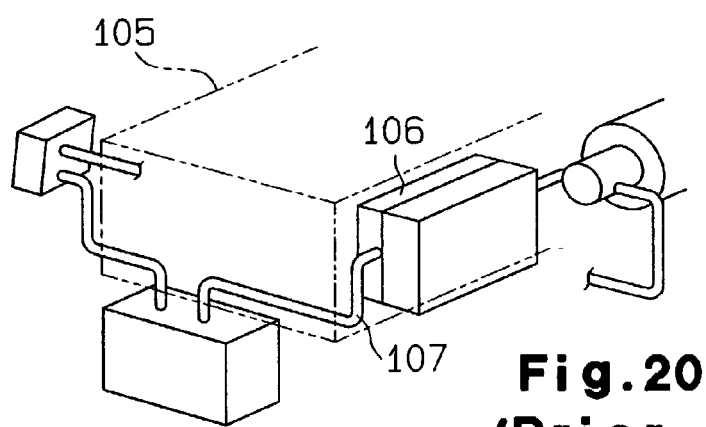
FIG. 20(a) is a perspective view illustrating a cooling device according to another prior art used in a control unit.
Figure 20B:
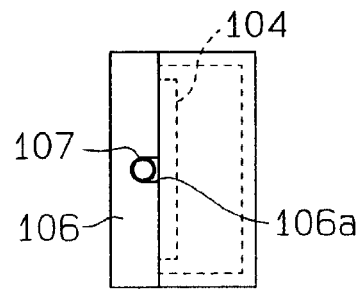
FIG. 20(b) is a side view illustrating the control unit shown in FIG. 20(a).

(1) The second air current cools the cooling portion 19. In addition, the first air current directly cools the electric circuit 18. Therefore, compared with a case when the heat of the control unit 104 is released from the cooling fins 101 as the cooling device shown in FIG. 19, or when the heat of the control unit 104 is released from the aluminum base 106 as the cooling device shown in FIGS. 20(a) and 20(b), the electric circuit 18, which has layers, is effectively cooled.

(2) The first air current that flows through the first inner passage formed in the unit cover 23 cools the electric circuit 18. Also, the second air current that flows through the second inner passage formed in the fin cover 26 cools the cooling fins 25. That is, the cooling portion 19 cools the electric circuit 18 via the mounting board 20 in addition to the first air current. Therefore, the electric circuit 18 is more efficiently cooled.

(3) The first cooling passage 30 is formed by parts of the vehicle frame 27 and the lower left side panel 28. The second cooling passage 31 is formed by the vehicle frame 27. Therefore, it is unnecessary to add new components to form the first cooling passage 30 and the second cooling passage 31.

(4) The exhaust fan 35 forces air out of the first cooling passage 30 to the outside of the vehicle body 11 and increases the flow rate of air drawn in from the outside of the vehicle body 11 to cool the electric circuit 18. Therefore, the electric circuit 18 is more efficiently cooled.

The cooling fan 48 forces air out of the fin cover 26 and increases the flow rate of air drawn in from the outside of the vehicle body 11 to cool the cooling portion 19. Therefore, the cooling portion 19 is more efficiently cooled. As a result, the electric circuit 18 is more efficiently cooled.

(5) The sponge cushion 49 prevents the air that has cooled the cooling portion 19 from flowing back to the upstream of the cooling portion 19 through the outside of the fin cover 26. As a result, the warm air is not used as the second air current again and only the air that is newly drawn into the fin cover 26 becomes the second air current. Therefore, the cooling portion 19 is more efficiently cooled.

(6) Each sponge filter 33, which closes one of the first inlet portions 32 of the first cooling passage 30, allows air in and prevents fluid, such as rain water and washing water, and dust from entering the first cooling passage 30. Therefore, the electric circuit 18 causes less failure due to water or dust.

(7) The inlet path, which extends from the outside inlets 46 to the upper inlet 41, is arranged to draw air into the second cooling passage 31. The inlet path prevents fluid such as rain water and washing water from entering the second cooling passage 31 from the outside of the vehicle body 11. Therefore, the cooling portion 19 causes less failure due to fluids, such as water.

(8) The air is carried rearward from the rear opening of the fin cover 26 by the cooling fan 48. The exhaust guide 50 then guides the air to the second outlet 47. Therefore, the air that has cooled the cooling portion 19 is efficiently exhausted to the outside of the vehicle body 11 from the second outlet 47 and new air is efficiently drawn into the second cooling passage 31. Therefore, the cooling portion 19 and the electric circuit 18 are more efficiently cooled.

(9) The exhaust duct 36, which forces air out of the first cooling passage 30, is open toward the center axis of the vehicle body 11 to avoid facing one of the rear wheels 17. Therefore, rain water, mud, tire particles, or the like are prevented from entering the first outlet 34 to the first cooling passage 30 through the exhaust duct 36. As a result, the electric circuit 18 does not cause failure due to foreign objects.

(10) The cooling device is located at the lower part of the vehicle body 11 between the front wheels 16 and the rear wheels 17. The control unit 14 is arranged at a position lower than the highest portions of the front wheels 16, which have larger diameter than the rear wheels 17. Therefore, it is unnecessary to obtain extra space for the control unit 14 and the cooling device at the upper portion of the vehicle body 11. Thus, the large capacity battery 13 can be installed.

(11) Air is drawn into the first cooling passage 30 through the first inlet portions 32. Air is drawn into the second cooling passage 31 through the outside inlets 46. The sufficient amount of air is drawn into the first and second cooling passages 30, 31 from the corresponding one of the first inlet portions 32 and the outside inlets 46, each having limited open area. Therefore, the electric circuit 18 and the cooling portion 19 are more efficiently cooled. The inlet path from the inlet portions 32 to the first cooling passage 30 and the inlet path from the outside inlets 46 to the second cooling passage 31 are short. Therefore, the air resistance is low when air is drawn into each of the first cooling passage 30 and the second cooling passage 31. This increases the flow rate of air that is drawn in. Thus, the electric circuit 18 and the cooling portion 19 are more efficiently cooled.

(12) The control unit 14 is arranged at the left lower portion of the vehicle body 11 between the front wheels 16 and the rear wheels 17. The electric circuit 18 is arranged outward of the forklift 10 and the cooling portion 19 is arranged inward of the forklift 10 in the left and right direction of the forklift 10. Therefore, the maintenance of the electric circuit 18 can easily be performed by opening the lower left side panel 28.

Figure 10:
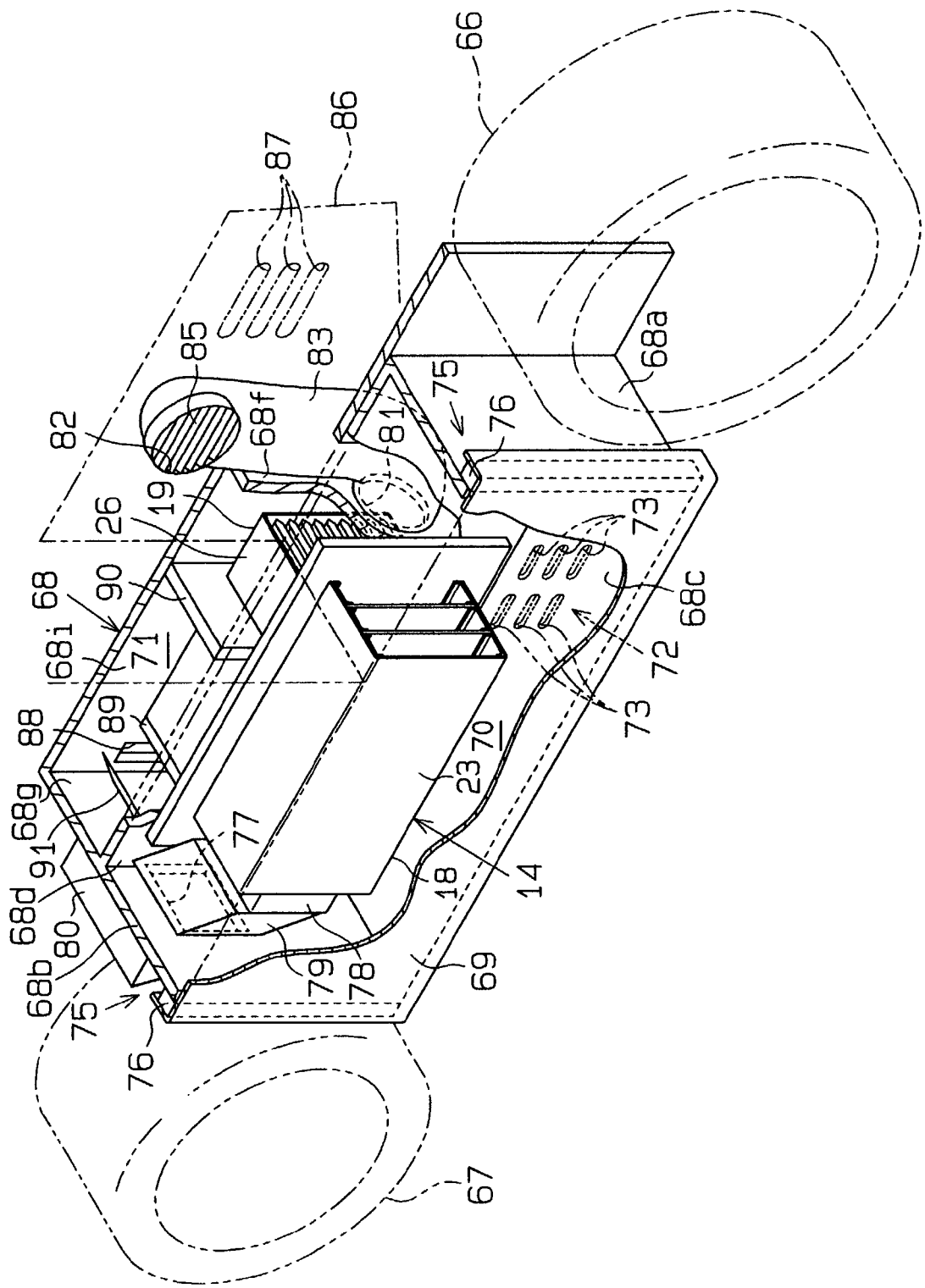
FIG. 10 is a schematic perspective view illustrating a cooling device according to a second embodiment of the present invention used in an electronic control device.

A cooling device according to a second embodiment of the present invention will now be described with reference to FIGS. 10 to 18. The right side of FIG. 10 is referred to as the front side of a forklift 60 and the left side of FIG. 10 is referred to as the rear side of the forklift 60. Elements that are like or identical to those shown in FIGS. 1 to 9 are denoted with the same reference numeral and detailed explanations are omitted.

Figure 11:
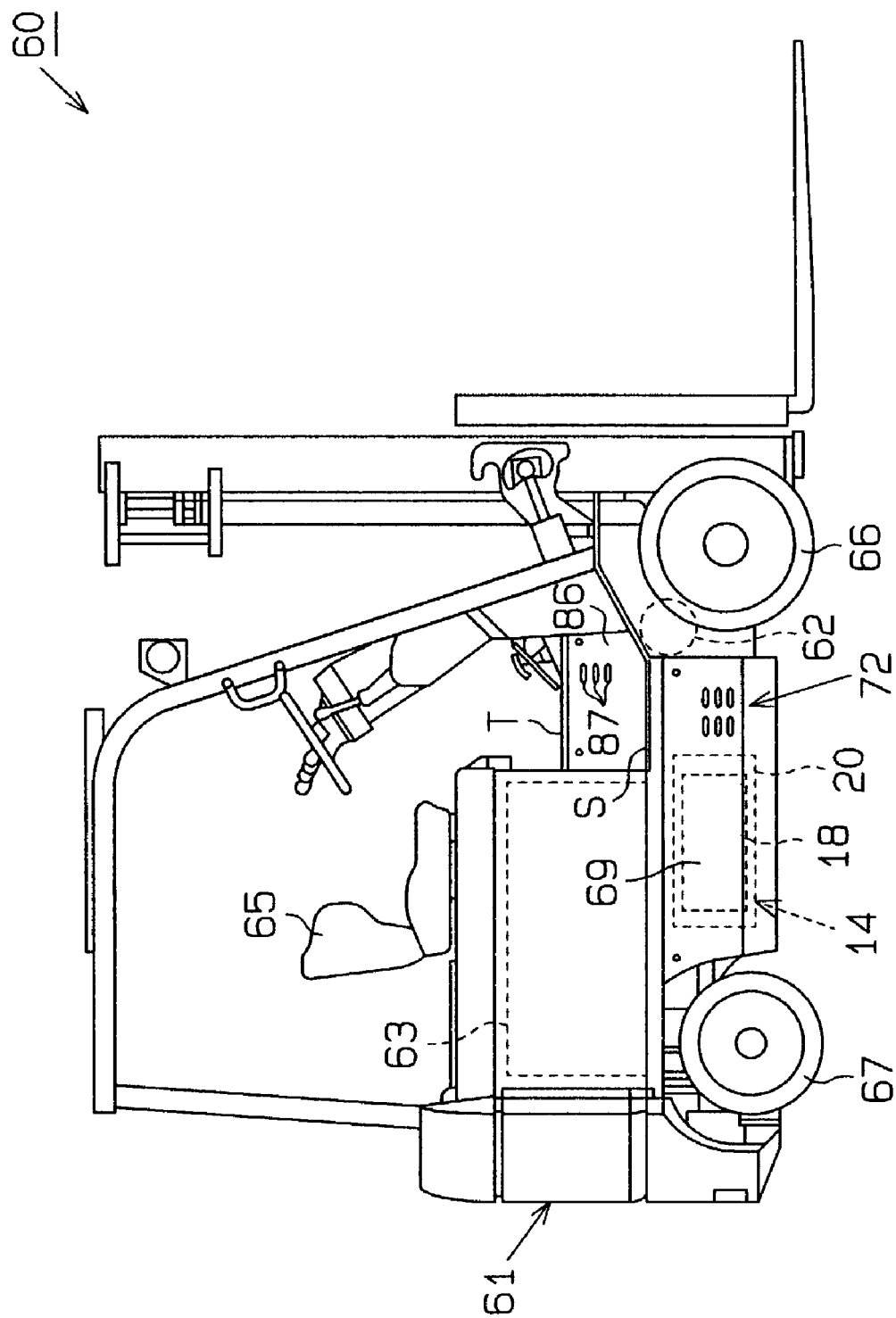
FIG. 11 is a schematic side view illustrating a forklift that has the cooling device shown in FIG. 10.

As shown in FIG. 11, a counterbalanced battery-powered forklift 60 includes a drive motor 62, a load motor, which is not shown, a battery 63, and the control unit 14 in a vehicle body 61. The drive motor 62 is arranged at the lower portion of the vehicle body 61 such that the drive motor 62 is located below the step S. The battery 63 is accommodated in a case, which is located between the step S and a seat 65. The control unit 14 is arranged between front wheels 66 and rear wheels 67 at the right side lower portion of the vehicle body 61. The diameters of the front wheels 66 are larger than the diameters of the rear wheels 67. The control unit 14 is arranged at a position lower than the highest points of the front wheels 66.

A cooling device for cooling the control unit 14 is located at the lower portion of the vehicle body 61. The cooling device will now be described.

Figure 12:
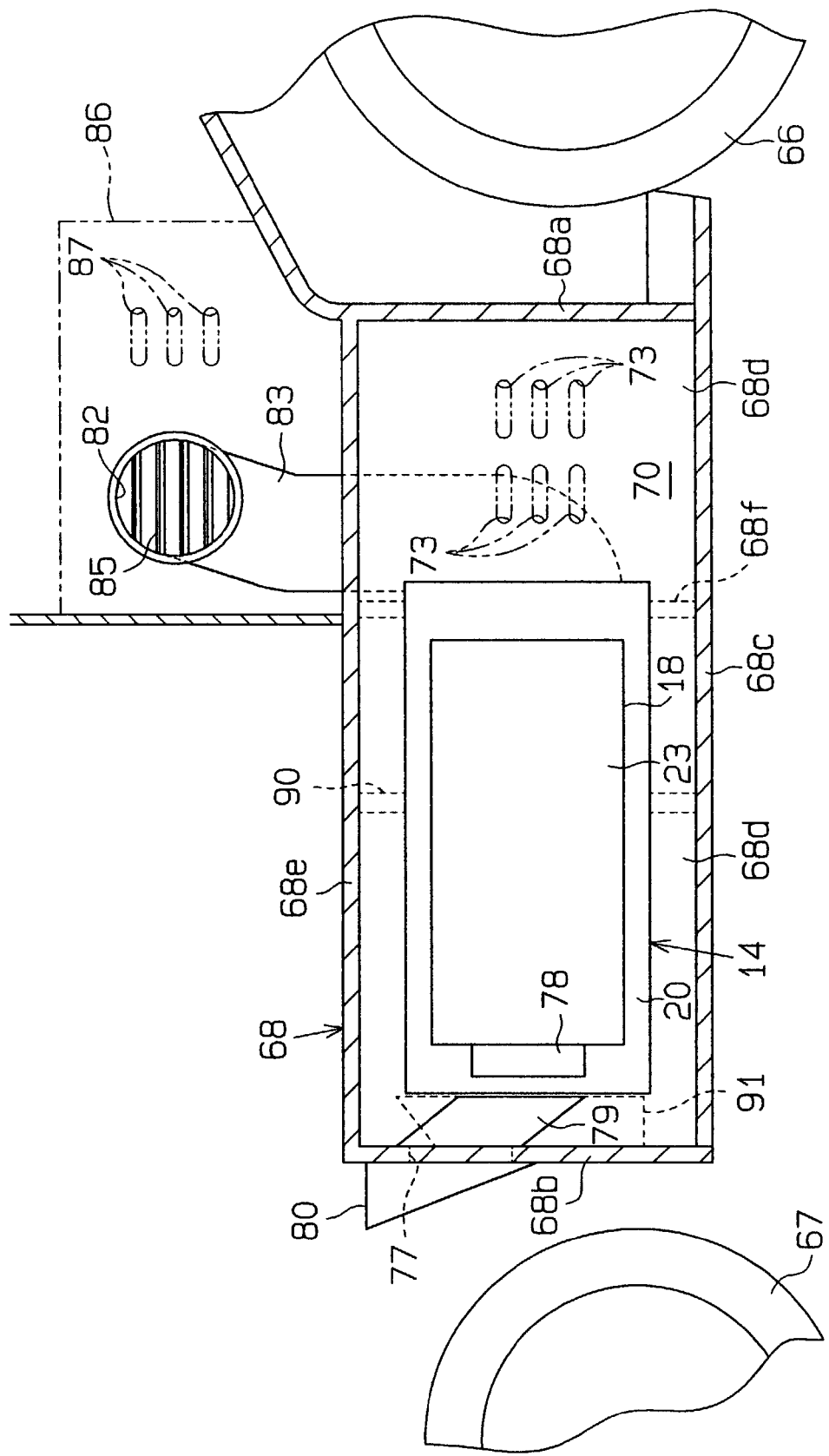
FIG. 12 is a diagrammatic cross-sectional view illustrating the first cooling passage shown in FIG. 10.
Figure 13:
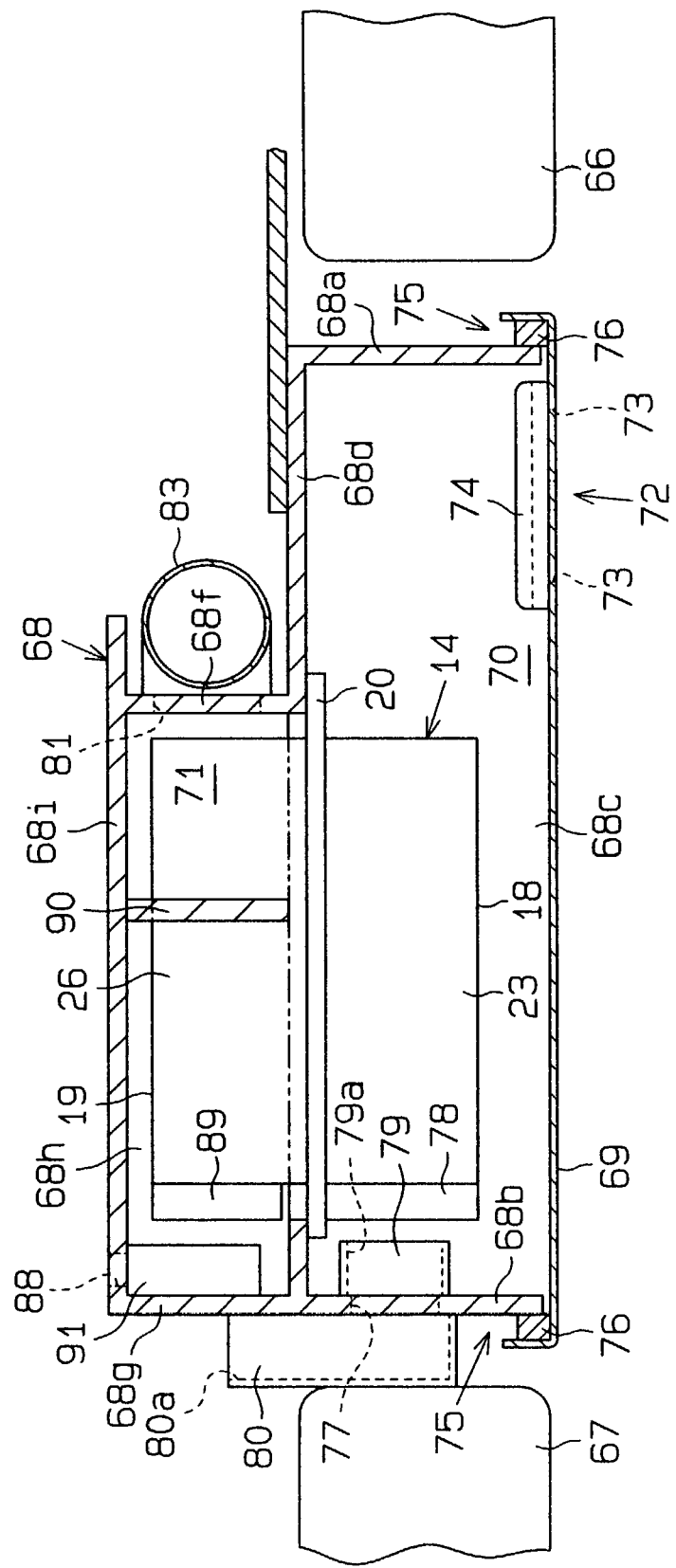
FIG. 13 is a diagrammatic cross-sectional view illustrating the first and second cooling passages shown in FIG. 10.

As shown in FIGS. 10, 12, and 13, the cooling device includes a first cooling passage 70 and a second cooling passage 71. The electric circuit 18 and the mounting board 20 of the control unit 14 are arranged in the first cooling passage 70. The cooling portion 19 is arranged in the second cooling passage 71. The first cooling passage 70 generates a first air current from air drawn in from the outside of the vehicle body 61. The first air current cools the electric circuit 18 and the mounting board 20. The second cooling passage 71 mainly generates a second air current, which cools the cooling portion 19. In the second embodiment, the first cooling passage 70 functions as a first air current generation mechanism and the second cooling passage 71 functions as a second air current generation mechanism.

The first cooling passage 70 is defined by a front wall 68*a*, a rear wall 68*b*, a bottom 68*c*, a dividing wall 68*d*, and a ceiling 68*e* (shown in FIG. 12 only), which form a part of the vehicle frame 68, and the lower right side panel 69. The first cooling passage 70 extends in the front and rear direction of the forklift 60 and is substantially rectangular. In the second embodiment, the vehicle frame 68 and the lower right side panel 69 are components of the vehicle body 61.

The second cooling passage 71 is defined by the dividing wall 68*d*, a front wall 68*f*, a rear wall 68*g*, a bottom 68*h*, an inner side wall 68*i*, and a ceiling 68*j* (shown in FIG. 12 only), which form a part of the vehicle frame 68. The second cooling passage 71 extends in the front and rear direction of the forklift 60 and is substantially a rectangular solid. The second cooling passage 71 shares the dividing wall 68*d* with the first cooling passage 70.

The electric circuit 18 and the mounting board 20 of the control unit 14 are arranged side by side along the longitudinal direction in the first cooling passage 70. The first cooling passage 70 generates the first air current, which cools the electric circuit 18 and the mounting board 20, with air drawn in from the outside of the vehicle body 61. In the second embodiment, the unit cover 23 forms a first inner passage in the first cooling passage 70 for the first air current to flow through. The first air current cools the electric circuit 18 and the mounting board 20.

Two slit-like first inlet portions 75 are each formed between the front wall 68*a* and the lower right side panel 69 and between the rear wall 68*b* and the lower right side panel 69. Each first inlet portion 75 is closed by a sponge filter 76 to prevent fluid, such as rain water and washing water, and dust from entering the first cooling passage 70.

Figure 14:
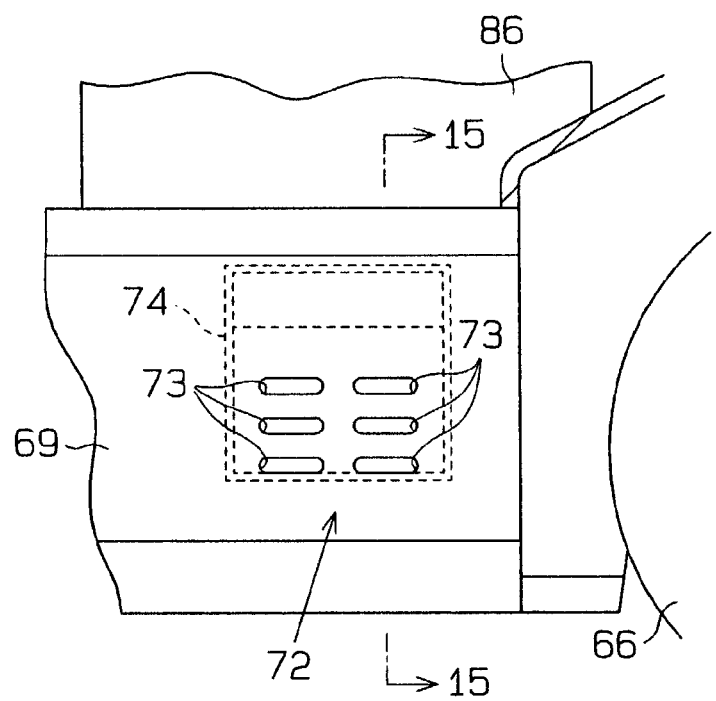
FIG. 14 is a diagrammatic front view illustrating a second inlet portion of the second embodiment.
Figure 15:
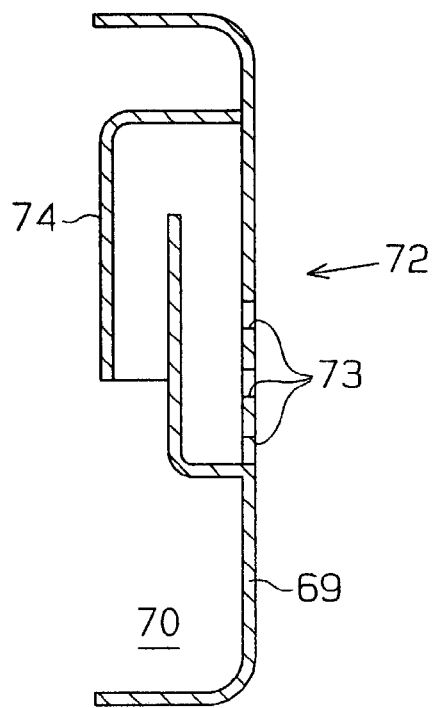
FIG. 15 is a schematic cross-sectional view taken along line 15—15 in FIG. 14.

A second inlet portion 72 is arranged in the first cooling passage 70 for drawing in air from the outside of the vehicle body 61. As shown in FIGS. 14 and 15, the second inlet portion 72 includes first outside inlets 73 (six first outside inlets 73 are shown in FIG. 14), which are formed in the lower right side panel 69, and an inlet guide 74. The inlet guide 74 guides air that is drawn in through the first outside inlets 73 upward and then to the first cooling passage 70. In the second embodiment, the first outside inlets 73 and the inlet guide 74 form an inlet path. For example, when water is thrown over the first outside inlets 73 from the outside of the vehicle body 61, the water that enters the inlet guide 74 through the first outside inlets 73 is guided downward. Therefore, the water does not reach the electric circuit 18.

Figure 16:
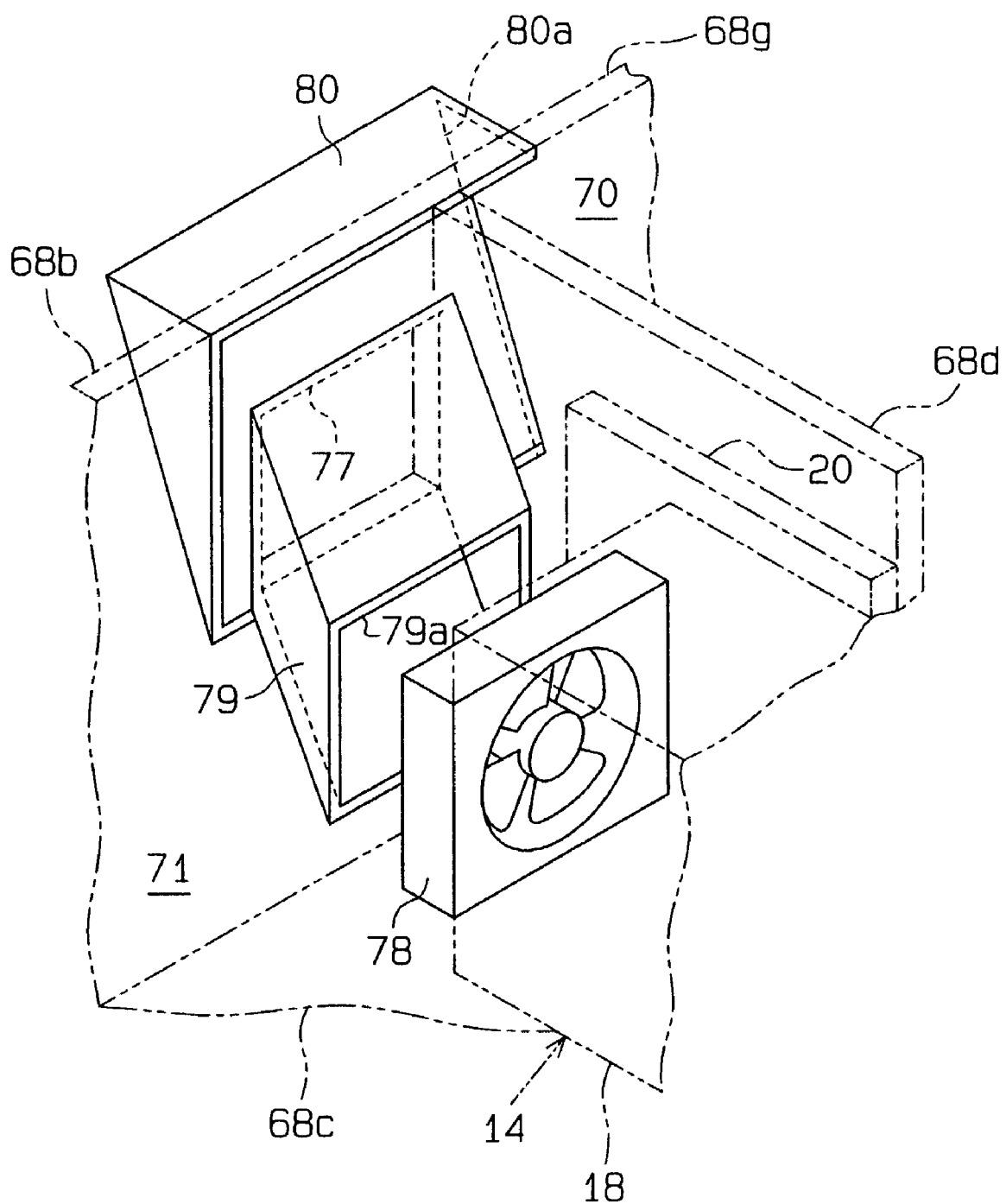
FIG. 16 is a diagrammatic perspective view illustrating an exhaust fan, an exhaust guide, a first outlet, and an exhaust duct of the second embodiment.

As shown in FIGS. 10, 13, and 16, a first outlet 77 is formed in the rear wall 68*b* for exhausting air that has cooled the electric circuit 18 to the outside of the vehicle body 61 from the first cooling passage 70. The first outlet 77 opens in front of the right rear wheel 67.

An exhaust fan 78 is located at the rear end of the electric circuit 18 to carry the air that is introduced into the unit cover 23 through the electric circuit 18. The exhaust fan 78 exhausts air from the unit cover 23 toward the first outlet 77 and draws air into the first cooling passage 70 through the second inlet portion 72 and the first inlet portions 75. Therefore, the flow rate of the first air current that cools the electric circuit 18 increases. In the second embodiment, the exhaust fan 78 functions as a first auxiliary cooling member.

As shown in FIGS. 10, 12, 13, and 16, a first exhaust guide 79, which is communicated with the first outlet 77, is attached to the front surface of the rear wall 68*b*. The first exhaust guide 79 forms a square conduit and the front opening 79*a* of the first exhaust guide 79 faces the exhaust fan 78. The first exhaust guide 79 guides the air that is carried rearward by the exhaust fan 78 to the first outlet 77. In the second embodiment, the first outlet 77 and the first exhaust guide 79 form an exhaust portion.

An exhaust duct 80 is arranged on the outer surface of the rear wall 68*b* to guide the air that is exhausted from the first outlet 77 to the outside of the vehicle body 61 and to prevent foreign objects from entering the first cooling passage 70. The exhaust duct 80 functions as an exhaust side filtering mechanism. The exhaust duct 80 is box-like and has an angular cross-section. The exhaust duct 80 is communicated with the first outlet 77 in the same manner as the exhaust duct 36 according to the first embodiment illustrated in FIGS. 1 to 9. The exhaust duct 80 has an inside outlet 80*a*, which is open toward the inner side of the vehicle body 61. The exhaust duct 80 prevents foreign objects, such as rain, dirt, or tire particles, from entering the first cooling passage 70 from the outside of the vehicle body 61 through the first outlet 77. At the same time, the exhaust duct 80 exhausts the air that has cooled the electric circuit 18 to the outside of the vehicle body 61 through the inside outlet 80*a*.

As shown in FIGS. 10, 12, and 13, the second cooling passage 71 accommodates the cooling portion 19 for the control unit 14 such that the longitudinal direction of the cooling portion 19 extend in the front and rear direction of the forklift 60. The second cooling passage 71 generates the second air current, which cools the cooling portion 19, with air drawn in from the outside of the vehicle body 61. The fin cover 26 serves as a second inner passage. The second inner passage lets the second air current, which cools the cooling portion 19, to flow through the second cooling passage 71.

A lower inlet 81 is formed in the front wall 68*f* of the second cooling passage 71. Air is drawn in from the outside of the vehicle body 61 through the lower inlet 81. The lower inlet 81 opens at a position opposite to the front opening of the fin cover 26 of the cooling portion 19.

Figure 17:
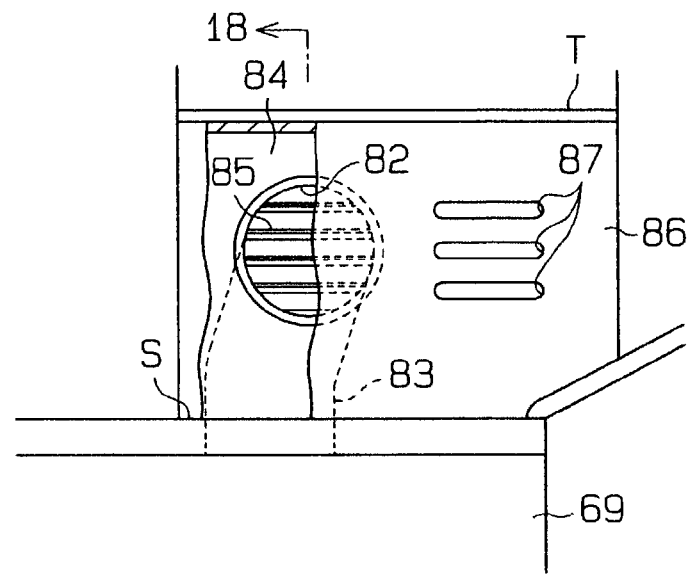
FIG. 17 is a schematic front view illustrating second outside inlets, an upper inlet, and an inlet duct of the second embodiment.
Figure 18:
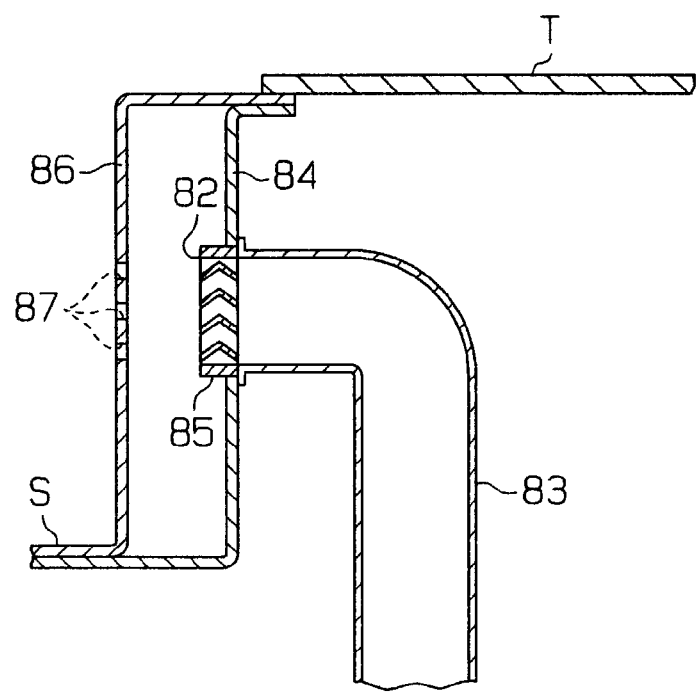
FIG. 18 is a schematic cross-sectional view taken along line 18—18 in FIG. 17.

An upper inlet 82 is formed at the upper portion of the vehicle body 61 between a toe board T and the step S. The upper inlet 82 is connected to the lower inlet 81 through a cylindrical inlet duct 83. As shown in FIGS. 17 and 18, the upper inlet 82 is arranged at the rear portion of an inside side panel 84, which is located between the toe board T and the step S. The upper inlet 82 has a louver 85, which prevents water from entering from above.

As shown in FIGS. 10, 11, and 12, an outside side panel 86 is located to cover the inside side panel 84. The outside side panel 86 includes three second outside inlets 87, which communicate the upper inlet 82 with the outside of the vehicle body 61. Each second outside inlet 87 is formed at a portion forward of the upper inlet 82. In the second embodiment, the path from the second outside inlets 87 to the upper inlet 82 serves as an inlet path. Each second outside inlet 87 is arranged not to overlap the upper inlet 82 viewing the upper inlet 82 from right in front. The inlet path prevents fluid such as rain and washing water from entering the second cooling passage 71 through the inlet duct 83 and the lower inlet 81 from the outside of the vehicle body 61. More specifically, water that enters the vehicle body 61 through the second outside inlets 87 does not reach the upper inlet 82 directly but drops down along the outer surface of the inside side panel 84. The water is then drained from between the inside side panel 84 and the outside side panel 86 to the outside of the vehicle body 61 through a drainage structure, which is not shown. Even if the water reaches the upper inlet 82 through the second outside inlets 87, the louver 85 prevents the water from entering the upper inlet 82.

The inlet duct 83 guides air from the second outside inlets 87 and the upper inlet 82, which are arranged at the upper portion of the vehicle body 61 and apart from the ground, to the lower inlet 81 of the second cooling passage 71, which is located at the lower portion of the vehicle body 61. In the second embodiment, the lower inlet 81, the upper inlet 82, the inlet duct 83, the inside side panel 84, the louver 85, the outside side panel 86, and the second outside inlets 87 form the second inlet portion 72. A bent path formed by the upper inlet 82, the inside side panel 84, louver 85, the outside side panel 86, and the second outside inlets 87 prevents foreign objects from entering the second cooling passage 71.

As shown in FIGS. 10 and 13, a second outlet 88 is formed in the rear portion of the inner side wall 68i for exhausting the air that has cooled the cooling portion 19 from the second cooling passage 71 to the outside of the vehicle body 61. The second outlet 88, which serves as an exhaust portion, is open toward the inner side of the vehicle body 61 to prevent foreign objects such as tire particles and water from entering the second cooling passage 71.

A second auxiliary cooling member, which is a cooling fan 89 in the second embodiment, is attached at the vicinity of the rear opening of the fin cover 26. The cooling fan 89 exhausts the air inside the fin cover 26 and draws air into the second cooling passage 71 through the lower inlet 81, the inlet duct 83, the upper inlet 82, and the second outside inlets 87. This increases the flow rate of the second air current for cooling the cooling portion 19.

As shown in FIGS. 10, 12, and 13, a sponge cushion 90 is arranged on the outer surface of the fin cover 26 for closing the space between the fin cover 26 and the inner wall of the second cooling passage 71. The sponge cushion 90 functions as backward flow suppressing means. The sponge cushion 90 prevents the air that has cooled the cooling portion 19 from flowing back to the upstream of the cooling portion 19 through the outside of the fin cover 26.

An air guiding member, which is a second exhaust guide 91 in the second embodiment, is attached to the inner surface of the rear wall 68g. The second exhaust guide 91 is open at a portion facing the cooling fan 89 and a portion facing the second outlet 88 in the same manner as the exhaust guide 50 according to the first embodiment illustrated in FIGS. 1 to 9. The second exhaust guide 91 prevents the air that is sent by the cooling fan 89 from being diffused and guides the air to the second outlet 88.

The operation of the second embodiment structured as above will now be described.

When the exhaust fan 78 is activated, the air in the unit cover 23 is carried toward the first outlet 77 through the first exhaust guide 79. The air is then exhausted to the outside of the vehicle body 61 through the first outlet 77 and the exhaust duct 80. Air is introduced into the first cooling passage 70 through the second inlet portion 72 and the first inlet portions 75. Since the exhaust fan 78 is arranged to face the vicinity of the rear opening of the unit cover 23, the pressure in the unit cover 23 more efficiently becomes low. Most of air drawn into the first cooling passage 70 becomes the first air current that flows through the first inner passage formed by the unit cover 23. The air then directly cools the substrates 21 and the electric power microchips 22. Some of air drawn into the first cooling passage 70 also cools the substrates 21 and the electric power microchips 22 indirectly via the unit cover 23. The first air current that has cooled the substrates 21 and the electric power microchips 22 is carried toward the first outlet 77 from the rear end of the unit cover 23 by the exhaust fan 78 and then exhausted to the outside of the vehicle body 61. As a result, the first air current that flows through the first inner passage in the unit cover 23 from the front side of the forklift 60 to the rear side of the forklift 60 directly cools the electric circuit 18, that is, not indirectly through the cooling portion 19.

When the cooling fan 89 is activated, the air is drawn out of the fin cover 26 and then sent toward the second exhaust guide 91. The air is guided toward the second outlet 88 by the second exhaust guide 91 and then exhausted to the outside of the vehicle body 61. Air is introduced into the second cooling passage 71 through the second outside inlets 87, the upper inlet 82, the inlet duct 83, and the lower inlet 81. Since the lower inlet 81 is arranged to face the vicinity of the front opening of the fin cover 26 and the pressure inside the fin cover 26 is low, most of air introduced into the second cooling passage 71 becomes the second air current that flows through the second inner passage formed by the fin cover 26. The second air current absorbs heat from the cooling fins 25 and indirectly cools the mounting board 20 and the electric power microchips 22. The second air current that has cooled the cooling portion 19 is carried toward the second exhaust guide 91 from the rear opening of the fin cover 26 by the cooling fan 89 and then exhausted to the outside of the vehicle body 61. As a result, the second air current that flows through the second inner passage in the fin cover 26 from the front side of the forklift 60 to the rear side of the forklift 60 directly cools the cooling portion 19.

The second embodiment provides the following advantages in addition to the advantages (1) to (12) of the first embodiment illustrated in FIGS. 1 to 9.

(13) Air is introduced into the first cooling passage 70 from the second inlet portion 72, which is arranged in the lower right side panel 69, which forms a part of the first cooling passage 70. Therefore, compared with a case when air is introduced into the first cooling passage 70 only from the first inlet portions 75 formed between the vehicle frame 68 and the lower right side panel 69, increased amount of air can be drawn into the first cooling passage 70. As a result, the electric circuit 18 having larger capacity can be sufficiently cooled.

(14) The second inlet portion 72 has the inlet path, which prevents fluid such as rain water and washing water from entering the first cooling passage 70 from the outside of the vehicle body 61. Accordingly, fluid such as rain water and washing water that has entered the first outside inlets 73, which is formed in the lower right side panel 69, is prevented from entering the first cooling passage 70. Thus, the electric circuit 18 causes less failure due to fluids, such as water.

(15) The first exhaust guide 79 guides the air that is exhausted from the unit cover 23 by the exhaust fan 78 to the first outlet 77. Therefore, even when the length of the first cooling passage 70 is greater than the longitudinal length of the electric circuit 18, the air that has cooled the electric circuit 18 can be efficiently exhausted to the outside of the vehicle body 61.

It should be apparent to those skilled in the art that the present invention may be embodied in many other specific forms without departing from the spirit or scope of the invention. Particularly, it should be understood that the invention may be embodied in the following forms.

In the first embodiment illustrated in FIGS. 1 to 9, air may be mixed between the first cooling passage 30 and the second cooling passage 31 as long as the first cooling passage 30 mainly cools the electric circuit 18 and the second cooling passage 31 mainly cools the cooling portion 19.

In the first embodiment illustrated in FIGS. 1 to 9, the position of the first cooling passage 30 and the second cooling passage 31 may be exchanged. Air may be introduced into the first cooling passage 30 through the inlet duct 42. In the second embodiment illustrated in FIGS. 10 to 18, the position of the first cooling passage 70 and the second cooling passage 71 may also be exchanged. Air may be introduced into the first cooling passage 70 through the inlet duct 83.

In the first embodiment illustrated in FIGS. 1 to 9, the second inlet portion 72 according to the second embodiment illustrated in FIGS. 10 to 18 may be arranged in the lower left side panel 28. In this case, the electric circuit 18 can be more efficiently cooled.

In the first embodiment illustrated in FIGS. 1 to 9, the direction of the air current may slightly be inclined up or down and left or right as long as the flowing direction is substantially the front and rear direction of the forklift 10.

In the embodiments illustrated in FIGS. 1 to 18, the electric circuit 18 need not be structured with multiple substrates 21 arranged in layers. The electric circuit 18 may be structured with a single substrate 21.

In the first embodiment illustrated in FIGS. 1 to 9, the outside side panel 45, in which the outside inlets 46 are formed, may be inclined with respect to the inside side panel 43, in which the upper inlet 41 is formed, in the vertical direction. In this case also, fluid is prevented from entering the vehicle body 11 since the outside inlets 46 are arranged not to overlap with the upper inlet 41 viewing in the direction perpendicular to the upper inlet 41. The second embodiment illustrated in FIGS. 10 to 18 may also be modified in the same manner.

In the first embodiment illustrated in FIGS. 1 to 9, the inlet duct 42 may be branched to connect the first cooling passage 30 to the inlet duct 42. Then, air may be introduced into the first cooling passage 30 through the outside inlets 46 and the upper inlet 41.

In the first embodiment illustrated in FIGS. 1 to 9, the control unit 14 may be arranged between the battery 13 and a balance weight such that the longitudinal direction of the control unit 14 extends in the left and right direction of the forklift 10. For example, the first cooling passage and the second cooling passage, which extend in the left and right direction of the forklift 10, may be formed using the battery case and the balance weight. In this case, the air current that is generated to flow through each cooling passage in the left and right direction of the forklift 10 cools the corresponding one of the electric circuit 18 or the cooling portion 19.

The cooling device according to the present invention may be applied to industrial vehicles other than counterbalanced battery-powered forklift. That is, the present invention may be applied to reach type forklift.

The cooling device of the present invention may be applied to industrial vehicles other than forklift. That is, the present invention may be applied to vehicles for high lift work, carriers, or tractors.

Therefore, the present examples and embodiments are to be considered as illustrative and not restrictive and the invention is not to be limited to the details given herein, but may be modified within the scope and equivalence of the appended claims.

What is claimed is:

1. A cooling device of a control unit in an industrial vehicle, wherein the industrial vehicle includes a control unit in which an electric circuit and a cooling portion are integrally formed, the cooling device comprising:
   a first cooling device for directing a first air current from air drawn in from the outside of an industrial vehicle body, wherein the first air current cools the electric circuit;
   a second cooling device for directing a second air current from air drawn in from the outside of the industrial vehicle body, wherein the second air current cools the cooling portion;
   a first exhaust fan for increasing the flow rate of the first air current by forcing air in from the outside of the industrial vehicle body; and
   a second exhaust fan for increasing the flow rate of the second air current by forcing air in from the outside of the industrial vehicle body.

2. The cooling device according to claim 1, wherein a first cooling passage is formed by a part of the industrial vehicle body, and wherein a second cooling passage is formed by a part of the industrial vehicle body.

3. The cooling device according to claim 2, further comprising:
   a first inner passage forming portion formed in the first cooling passage, wherein a first inner passage is formed in the first inner passage forming portion, and the first air current flows through the first inner passage, wherein the electric circuit is arranged in the first inner passage; and
   a second inner passage forming portion formed in the second cooling passage, wherein a second inner passage is formed in the second inner passage forming portion, and the second air current flows through the second inner passage, wherein the cooling portion is arranged in the second inner passage.

4. The cooling device according to claim 3, wherein the first inner passage forming portion is a unit cover for protecting the electric circuit, and the second inner passage forming portion is a fin cover for covering the cooling portion.

5. The cooling device according to claim 2, further comprising an inlet portion for drawing air into one of the first cooling passage and the second cooling passage from the outside of the industrial vehicle body, wherein the inlet portion is structured to prevent foreign objects from entering the inlet portion from the outside of the industrial vehicle body.

6. The cooling device according to claim 5, wherein the inlet portion includes a bent path.

7. The cooling device according to claim 5, wherein the inlet portion is an inlet and a filter attached to the inlet.

8. The cooling device according to claim 2, further comprising:
an exhaust portion for exhausting one of air that has cooled the electric circuit in the first cooling passage and air that has cooled the cooling portion in the second cooling passage to the outside of the industrial vehicle body; and
an exhaust side filtering mechanism for preventing foreign objects from entering the exhaust portion from the outside of the industrial vehicle body.

9. The cooling device according to claim 2, further comprising:
a first inlet portion for drawing air into the first cooling passage from the outside of the industrial vehicle body; and
a second inlet portion for drawing air into the second cooling passage from the outside of the industrial vehicle body, wherein the first inlet portion and the second inlet portion are separately formed.

10. A cooling device of a control unit in an industrial vehicle, wherein the industrial vehicle includes a control unit in which an electric circuit and a cooling portion are integrally formed, the cooling device comprising:
a first cooling passage for directing a first air current from air drawn in from the outside of the industrial vehicle body, wherein the first air current cools the electric circuit, the first cooling passage is formed by a part of the industrial vehicle body, a first inner passage forming portion is formed in the first cooling passage, a first inner passage is formed in the first inner passage forming portion, the first air current flows through the first inner passage, the electric circuit is arranged in the first inner passage;
a first exhaust fan is located downstream of the first inner passage, and the first exhaust fan draws air into the first inner passage from the outside of the industrial vehicle body;
a second cooling passage for directing a second air current from air drawn in from the outside of the industrial vehicle body, wherein the second air current cools the cooling portion, the second cooling passage is formed by a part of the industrial vehicle body, a second inner passage forming portion is formed in the second cooling passage, a second inner passage is formed in the second inner passage forming portion, the second air current flows through the second inner passage, the cooling portion is arranged in the second inner passage; and
a second exhaust fan is located downstream of the second inner passage, and the second exhaust fan draws air into the second inner passage from the outside of the industrial vehicle body.

11. The cooling device according to claim 10, further comprising:
an exhaust portion for exhausting air carried by one of the first exhaust fan and the second exhaust fan to the outside of the industrial vehicle body; and
an air guiding member for guiding air to the exhaust portion from the fan.

12. The cooling device according to claim 10, further comprising:
backward flow suppressing member located in the second cooling passage, wherein the backward flow suppressing member prevents the air that has cooled the cooling portion from flowing back upstream in the second inner passage via the outside of the second inner passage forming portion.

13. A cooling device of a control unit in an industrial vehicle, wherein the industrial vehicle includes a control unit in which an electric circuit and a cooling portion are integrally formed, the cooling device comprising:
a first cooling device for directing a first air current with air drawn in from the outside of an industrial vehicle body, wherein the first air current cools the electric circuit, wherein the air drawn into a first cooling passage is exhausted to the outside of the industrial vehicle body;
a second cooling device for directing a second air current with air drawn in from the outside of the industrial vehicle body, wherein the second air current cools the cooling portion, wherein the air drawn into a second cooling passage is exhausted to the outside of the industrial vehicle body;
a first exhaust fan for increasing the flow rate of the first air current by forcing air into the first cooling passage from the outside of the industrial vehicle body; and
a second exhaust fan for increasing the flow rate of the second air current by forcing air into the second cooling passage from the outside of the industrial vehicle body.

14. The cooling device according to claim 13, wherein the first cooling passage and the second cooling passage are formed by a part of the industrial vehicle body.

15. The cooling device according to claim 14, further comprising:
a first inner passage forming portion formed in the first cooling passage, wherein a first inner passage is formed in the first inner passage forming portion, and the first air current flows through the first inner passage, wherein the electric circuit is arranged in the first inner passage; and
a second inner passage forming portion formed in the second cooling passage, wherein a second inner passage is formed in the second inner passage forming portion, and the second air current flows through the second inner passage, wherein the cooling portion is arranged in the second inner passage.

16. The cooling device according to claim 15, wherein the first inner passage forming portion is a unit cover for protecting the electric circuit, and the second inner passage forming portion is a fin cover for covering the cooling portion.

17. The cooling device according to claim 13, further comprising:
a first inlet portion for drawing air into the first cooling passage from the outside of the industrial vehicle body;
a second inlet portion for drawing air into the second cooling passage from the outside of the industrial vehicle body, wherein the first inlet portion and the second inlet portion are separately formed.

* * * * *